United States Patent [19]

Peters

[11] 4,381,490

[45] Apr. 26, 1983

[54] MAGNETIC STATE SELECTOR

[76] Inventor: Harry E. Peters, P.O. Box 1877, Tuscaloosa, Ala. 35403

[21] Appl. No.: 318,603

[22] Filed: Nov. 5, 1981

[51] Int. Cl.³ .............................................. H01F 5/00
[52] U.S. Cl. ................................... 335/210; 335/297
[58] Field of Search ............... 335/210, 296, 297, 306; 378/228, 230, 256; 250/396 ML

[56] References Cited
U.S. PATENT DOCUMENTS 3,355,586 11/1967 Brechna et al. ................. 335/210 X
3,831,121 8/1974 Oster ................................... 335/210

Primary Examiner—George Harris
Attorney, Agent, or Firm—Isaac P. Espy

[57] ABSTRACT

An improvement in an atomic or molecular magnetic quantum state selector wherein the bore and gap spacing may be adjusted or calibrated precisely after assembly by providing adjustable segments in the supporting structure surrounding the pole tips. The adjustable bore and gaps make it feasible to construct small size state selectors with precision bore and gap dimensions which have heretofore been difficult or impossible to realize due to the unrealistically small dimensional tolerances which would be required in previous conceptions of these devices.

3 Claims, 6 Drawing Figures

MAGNETIC STATE SELECTOR

BACKGROUND OF THE INVENTION

This invention relates generally to atomic or molecular beam devices using magnetically state selected or polarized atoms or molecules and more particularly to improvements in atomic beam frequency and time standards such as the atomic hydrogen maser, or the atomic cesium beam tube.

Many atoms or molecules in several of their quantum energy states have a magnetic dipole moment, or may have a magnetic dipole moment induced in the presence of an external magnetic field, and when present in a region where gradients in the external magnetic field also exist they experience forces which depend on the magnitude and sign of the magnetic dipole moment, and upon the magnitude and direction of the magnetic field gradient.

Magnetic state selectors, also known as focussing magnets, are devices through which a beam of atoms or molecules is made to pass, and in which atoms if different quantum energy states are selected, or focussed, or defocussed, so that the emergent beam is sorted out spatially, and atoms in one or more particular states (or polarizations) may be used in devices whose operation depends upon the presence or absence of one of more states.

For example, the atomic hydrogen maser is a precision frequency and time standard the frequency of which is derived from transitions between magnetic quantum energy states in the ground electronic state of atomic hydrogen. In the hydrogen maser, hydrogen molecules are separated into atoms in a gaseous radio frequency (RF) discharge, called the source, from which they emerge through a small tubular exit hole in a beam directed generally along an axis. A portion of the beam passes through a magnetic state selector placed along the axis wherein atoms in two of the four equally populated magnetic quantum states are caused to diverge from the beam (or become defocussed) and atoms in the other two states are caused to converge towards the axis. Thus a state selected beam of atoms is caused to enter a storage vessel within an RF cavity interaction region downstream of the state selector magnet wherein maser action takes place, and an RF signal is generated at the frequency of 1,420,405,751.6893 Hz or thereabouts. Through electronic circuitry this signa is used to generate standard frequency and time output signals.

State selectors used in the past have been difficult to construct and generally larger and heavier than theoretically required for the particular application because the precision of the bore and the gap dimensions was affected by the accumulated imprecision of the several parts. The lack of convenient facility for adjustment of the bore or gaps after the state selector is assembled makes use of the optimum geometrical configuration impossible or extremely difficult to achieve with the present state of the art.

SUMMARY OF THE INVENTION

It is the primary object of this invention to provide an improved atomic or molecular magnetic state selector.

A further object of this invention is to provide a state selector wherein the bore and gaps may be adjusted after assembly, providing high precision and convenient variation of dimensions.

Another object of this invention is to provide a state selector which is smaller, lighter, more precise, and causes less perturbation of the surrounding magnetic field so that atomic or molecular beam devices may be made much smaller, lighter, and more stable and accurate than has been achievable with present state of the art devices.

A further object of this invention, consequent upon the foregoing, is to provide a state selector in which the bore and gap dimensions may be conveniently made to vary along the axis so that the largest possible acceptance angle for the atomic beam is achieved and the largest possible fraction of the state selected beams may be directed to the target point. Since the optimum bore entrance diameter may be extremely small (0.005 inches or less) this object is only practically achievable with the features cited for the present invention.

These and other objects of the invention are achieved by constructing the state selector with separate sections which are held together with screws placed in oversized or elongated holes, so that after preliminary assembly each pole tip may be independently positioned transversely and radially. Thus extremely small machining tolerances are not required of the separate parts and the unit may be adjusted and calibrated or have its pole tips changed or cleaned if necessary.

In summary, my invention consists of constructing the Improved Magnetic State Selector with separated adjustable segments of soft iron material surrounding the energizing permanent magnets and pole tips, with screws in holes with adequate clearance to provide variable positioning of the pole tips for optimum state selection and focussing of the atomic beam. This arrangement allows freedom of movement in five degrees; horizontally, vertically, radially, and angularly in two planes.

The invention herein described can be used in a great many applications. Some of these are: atomic and molecular beam magnetic resonance devices, physics experiments using polarized atoms or molecules, atomic beam frequency and time standards based upon cesium, thallium, rubidium, silver, or like atoms, atomic beam masers such as the hydrogen maser, rubidium maser, thallium maser, or similar devices which may be made feasible by the present invention, high energy physics experiments with polarized particles such as neutrons or protons; and many similar applications.

The invention herein described may be realized in several geometrical configurations utilizing an even number of magnets of alternating polarities depending upon the atom or molecule to be state selected or focussed and other details of the overall apparatus design. The most useful configurations are the quadrupole state selector and the hexapole state selector, and subsequent descriptions and illustrations will relate to feasible configurations of each of these types.

With the principles illustrated by these configurations a great many variations in materials and design details will achieve the advantages of the present invention, thus the embodiments set forth below are for illustrative purposes only; other embodiments and applications will be readily apparent to those familiar with the state of the art.

DETAILED DESCRIPTION OF THE INVENTION

Figure 1:
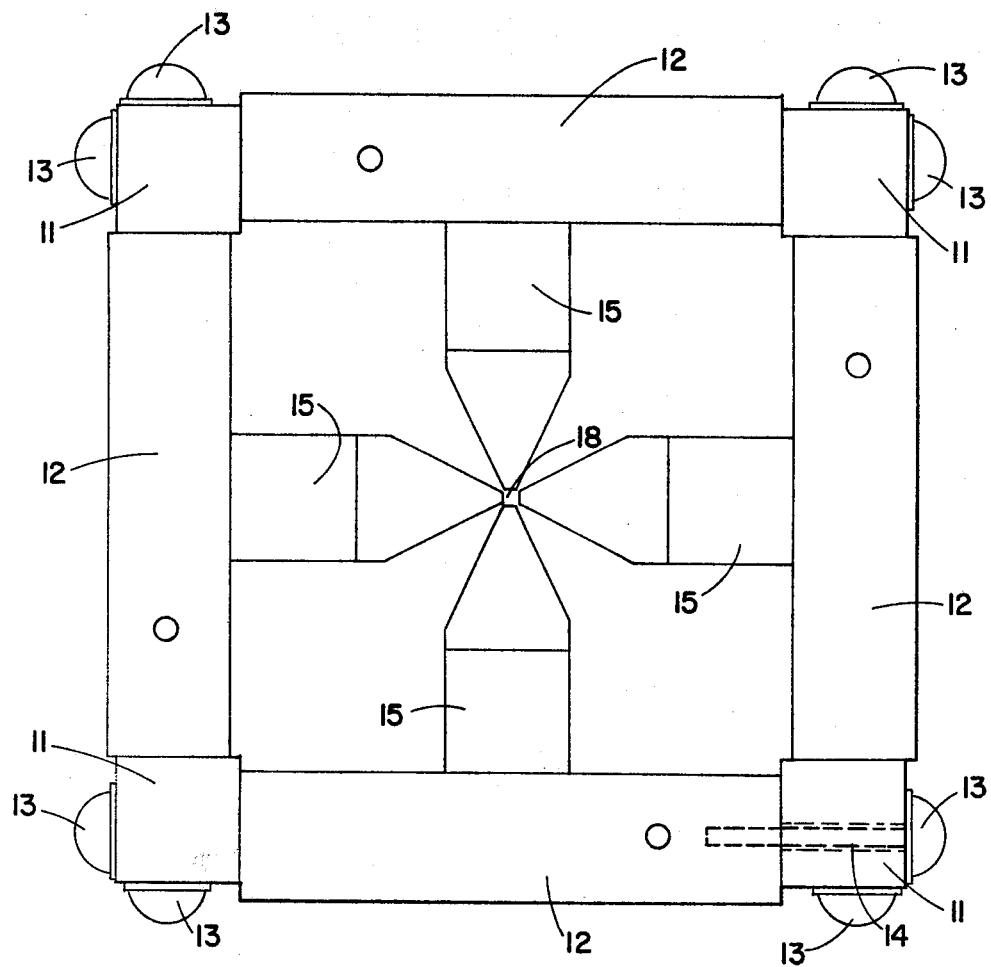
FIG. 1 is a plan view of the quadrupole embodiment of the Improved Magnetic State Selector.

FIG. 1 is a plan view of the quadrupole embodiment of Improved Magnetic State Selector. The connector posts 11 spatially fix the side plates 12, and are rigidly fastened together by positioning fasteners 13. The connector posts 11 have holes 14 just slightly larger than the diameter of the positioning fasteners. The holes and positioning fasteners have a horizontal centerline in the vertical plane of each adjoining side plate. In a typical embodiment, #4-40 machine screws are used as positioning fasteners, which have an outside diameter of 0.112 inch; in that case, the hole 14 would be 0.144 inch in diameter, leaving "play" or "slack" of 0.032 inch, the difference between the diameters of the connecting post holes and the positioning fasteners in them.

Figure 2:
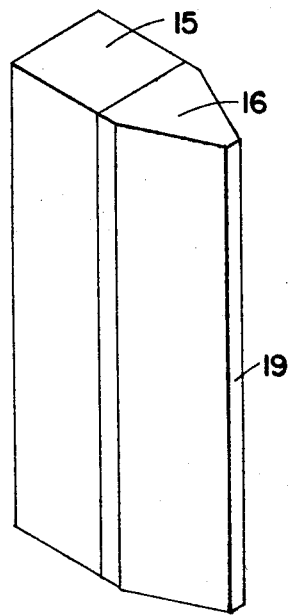
FIG. 2 is a perspective view of one magnet and an attached pole piece.

Permanent magnets 15 are fastened to the side plates 12, preferably by adhesives such as epoxy, although other means such as U-shaped threaded fasteners, are acceptable. When using U-shaped threaded fasteners (not shown in the drawings) the magnets may be moved laterally parallel to the side plates without disturbing the connections between the connecting posts and the side plates. FIG. 2 is a perspective view of an individual magnets 15 with a pole piece 16 attached. The embodiments described in the drawings are shown using adhesive attachments of the magnets to the side plates.

Figure 3:
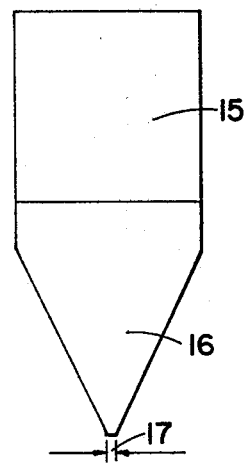
FIG. 3 is a plan view of one magnet and an attached pole piece.

The magnets are preferably of samarium colbalt, mishmetal cobalt, alnico, but any other similar material is also acceptable; and the pole pieces 16, side plates 12, and connector posts 11, are made of a structurally rigid high permeability soft magnetic material, preferably of magnetic ingot iron. The pole pieces are tapered in the horizontal plane from the approximate width of the magnets to a narrow vertical face. Referring to FIG. 3, the narrow face of the pole piece 16 is typically of small dimension, the FIG. 17 representing a typical dimension of about 0.010 inch.

Referring again to FIG. 1, the size and configuration of the bore 18 formed by the narrow faces 19 (of FIG. 2) of the pole pieces, is critical, and typically very small; for example, in the order of 0.020 inch from face to face. While the narrow face 19 is shown in the drawing as flat or planar, in practice the face is slightly rounded on the edges, with a radius too small to be described on the drawing.

Figure 4:
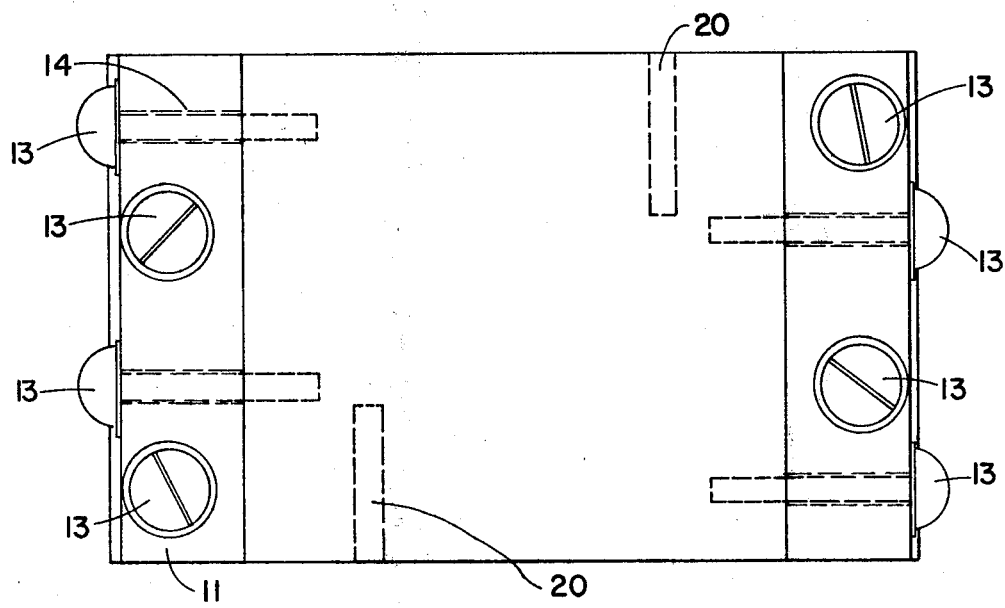
FIG. 4 is a side view of the quadrupole embodiment of the Improved Magnetic State Selector.

FIG. 4 shows a side view of the quadrupole embodiment of the Improved Magnetic State Selector. This view shows threaded openings 20 which are used for mounting the Improved Magnetic State Selector to the instrument or device in which it is employed.

Figure 5:
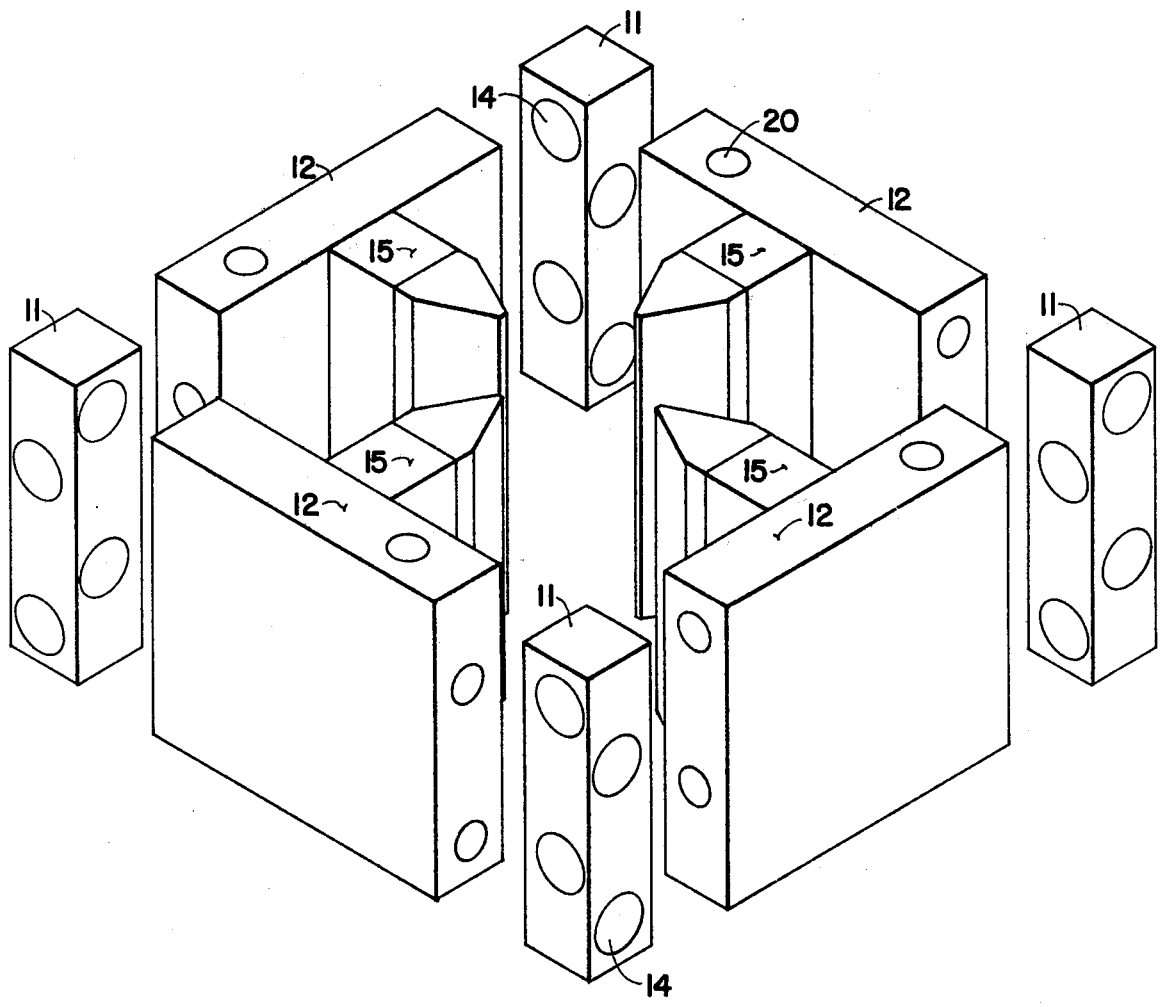
FIG. 5 is an exploded perspective view of the quadrupole embodiment of the Improved Magnetic State Selector.

FIG. 5 is an exploded view of the quadrupole embodiment of the Improved Magnetic State Selector. Its various parts are numbered with the same numerals used in the other views.

The object of the invention is to present the narrow faces of the pole in such a spatial relationship with each other as to provide a specific highly critical bore between opposite pole pieces, and gap between adjacent pieces. The magnets and attached pole pieces are regularly spaced in the horizontal plane about a bore point and radial to the bore point. By regular spacing, I mean that in the quadrupole embodiment, the magnets are spaced 90° from each other; and in the hexapole embodiment the magnets are spaced 60° from each other. The narrow faces of the pole pieces are parallel to or nearly parallel to an axis through the bore point, near to the axis through the bore point, and equidistant therefrom. The side plates are perpendicular to the radials from the bore point at the centers of the side plates. The connector posts are perpendicular to the horizontal plane, and perpendicular to and centered on a radial from the bore point which is angularly equidistant from the radials to the centerlines of the adjoining magnets and pole pieces. Without adjustability as provided in this invention, each piece would have to be machined to perfect dimension; later, adjustments required by operational requirements and fine tuning would be impossible.

Adjustability is provided in five degrees of freedom; horizontally, vertically, radial to the bore, angularly in the horizontal plane and angularly in a vertical plane passing through the radial to the bore. The adjustment can be made by loosening one or more fasteners, moving the side plates in the direction required, and retightening. By using a nonmagnetic bore gauge, inserted in the bore, adjustment can be made without measurement, and by loosening only one side at a time.

The holes 14 through the connector posts are staggered so that the fasteners to adjacent sides are not in the same horizontal plane. As shown on FIG. 1, this adjustability is possible because the connector posts are not centered on the adjacent sides; allowing radial movement of each side plate in an amount not exceeding the difference between the diameters of the connector post holes and the positioning fasteners therein. Thus adjustments may be made to one side without physically being blocked by the corner of an adjacent side.

Figure 6:
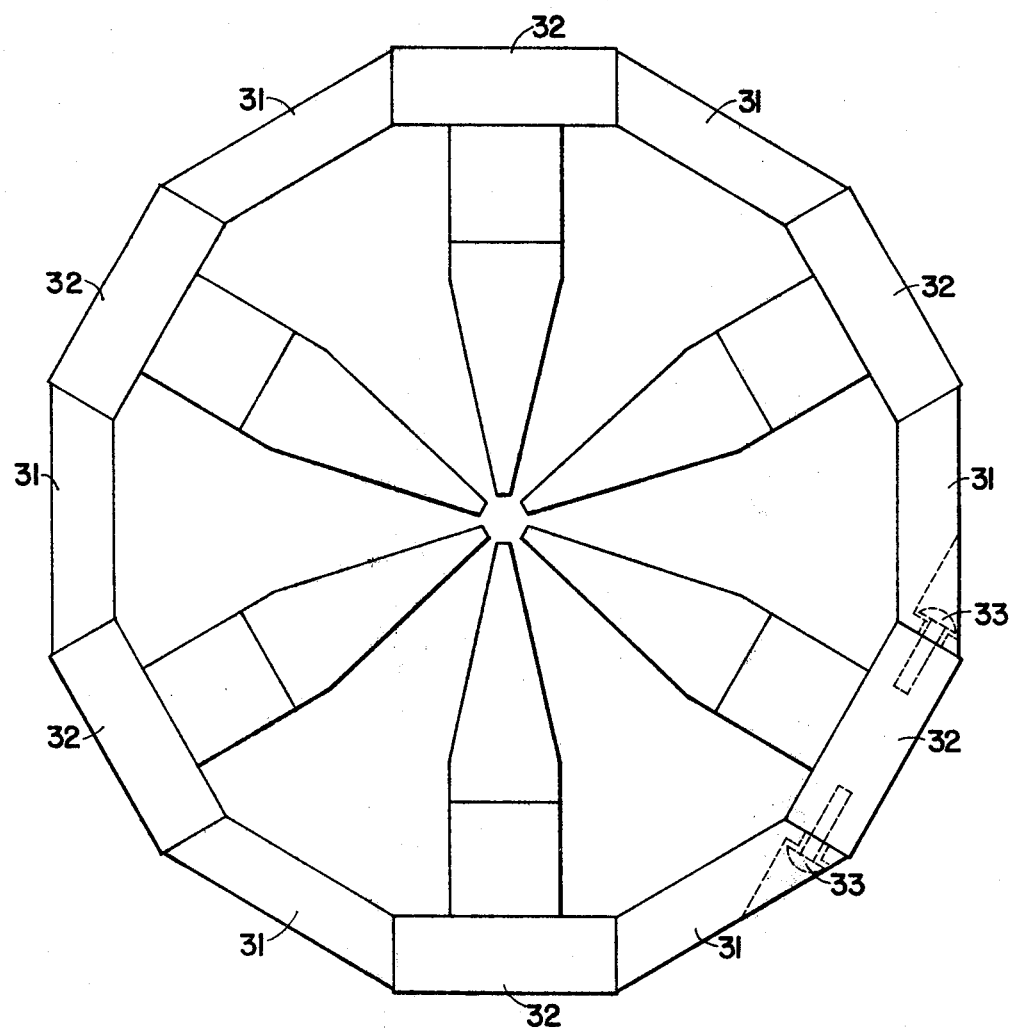
FIG. 6 is a plan view of the hexapole embodiment of the Improved Magnetic State Selector.

The hexapole embodiment of the Improved Magnetic State Selection is shown in a plan view in FIG. 6.

The same principle is involved in this embodiment of the invention as in the quadrupole embodiment. Connector posts 31 spatially fix side plates 32, and are rigidly fastened together by positioning fasteners 33. The connector posts 31 have holes in the vertical plane of the adjoining side plates 32, just slightly larger than the diameter of the positioning fasteners. After initial assembly, adjustments may be made by inserting a nonmagnetic bore and gap gauge, and serially loosening, adjusting, and tightening the sides.

Having described my invention in part by referral to preferred embodiments, but without limitation thereto.

I claim:

1. An improved magnetic state selector comprising multiple even numbered magnets, pole pieces, side plates, and connecting posts wherein the pole pieces are adjustable in five degrees of freedom;

said magnets having attached thereto the said pole pieces, said pole pieces being tapered in the horizontal plane from the approximate width of the magnets to a narrow vertical face;

said magnets and attached pole pieces being regularly spaced in the horizontal plane about a bore point and radial to said point, the narrow faces of said pole pieces being spaced equidistant from and near to and, selectively, adjustable in a range from nearly parallel to an axis to parallel to an axis perpendicular to said horizontal plane and passing through said bore point;

each of said magnets being attached to a side plate, the side of the magnet being attached to the side plate being on the opposite face of the magnet from the pole piece of said magnet;

said side plate, in the horizontal plane, being perpendicular to a radial from the bore point at the center of the side plate; said radial, in the horizontal plane, being the centerline of the pole piece and magnet;

said connector posts being perpendicular to said horizontal plane and perpendicular to and centered on a radial from the said bore point angularly equidistant from the radials to the centerlines of the adjoining magnets and pole pieces;

said connector posts having a multiplicity of holes and positioning fasteners therein, in the vertical plane of each adjoining side plate, said holes and positioning fasteners having a horizontal centerline, and the diameter of each positioning fastener hole being slightly larger than the diameter of the positioning fastener therein, said positioning fasteners extending into and fastened to each adjoining side plate;

said pole pieces, side plates and connecting posts being made of structurally rigid high permeability soft magnetic material;

said side plates being so centered about said connecting posts as to allow radial movement relative therto in an amount not exceeding the difference between the diameters of the connector post holes and the positioning fasteners therein.

2. The invention of claim number 1 comprising four magnets and pole pieces, four side plates, and four connector posts.

3. The invention of claim number 1 comprising six magnets and pole pieces, six side plates, and six connector posts.

* * * * *